United States Patent
Qin et al.

(10) Patent No.: US 10,101,919 B2
(45) Date of Patent: Oct. 16, 2018

(54) CHIPSET AND SERVER SYSTEM USING THE SAME

(71) Applicant: VIA Alliance Semiconductor Co., Ltd., Shanghai (CN)

(72) Inventors: Shuang-Shuang Qin, Beijing (CN); Kuo-Chun Yang, Beijing (CN); Hao-Lin Lin, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 220 days.

(21) Appl. No.: 14/953,728

(22) Filed: Nov. 30, 2015

(65) Prior Publication Data

US 2017/0139592 A1    May 18, 2017

(30) Foreign Application Priority Data

Nov. 13, 2015 (CN) .......................... 2015 1 0780873

(51) Int. Cl.

| | |
|---|---|
| *G06F 3/06* | (2006.01) |
| *G06F 13/40* | (2006.01) |
| *G06F 13/42* | (2006.01) |
| *G06F 9/44* | (2018.01) |
| *G06F 9/4401* | (2018.01) |

(52) U.S. Cl.
CPC .............. *G06F 3/061* (2013.01); *G06F 3/067* (2013.01); *G06F 3/0655* (2013.01); *G06F 3/0679* (2013.01); *G06F 9/4401* (2013.01); *G06F 13/4022* (2013.01); *G06F 13/4282* (2013.01)

(58) Field of Classification Search
CPC ........ G06F 3/061; G06F 9/4401; G06F 3/067; G06F 3/0655; G06F 13/4282; G06F 13/4022; G06F 3/0679
See application file for complete search history.

(56) References Cited

U.S. PATENT DOCUMENTS

| | | | |
|---|---|---|---|
| 2005/0066106 A1 | 3/2005 | Lee | |
| 2007/0240019 A1* | 10/2007 | Brady | G06F 13/4291 714/43 |
| 2011/0119410 A1 | 5/2011 | Chen et al. | |
| 2011/0191573 A1* | 8/2011 | Li | G06F 15/177 713/2 |
| 2013/0159576 A1* | 6/2013 | Kegel | G06F 13/24 710/262 |
| 2014/0195634 A1* | 7/2014 | Kishore | H04L 67/1097 709/213 |
| 2014/0317267 A1* | 10/2014 | Ramachandran | H04L 41/24 709/224 |

* cited by examiner

*Primary Examiner* — Ernest Unelus
*Assistant Examiner* — Ronald T Modo
(74) *Attorney, Agent, or Firm* — McClure, Qualey & Rodack, LLP

(57) ABSTRACT

A chipset implemented in a server node of a server system and including an embedded management controller is disclosed. The chipset also includes a northbridge and southbridge. The embedded management controller collects inner-node information of the server node for server system management. The embedded management controller is coupled to a baseboard management controller, and the baseboard management controller is outside the server node and communicates with a remote console through network.

7 Claims, 8 Drawing Sheets

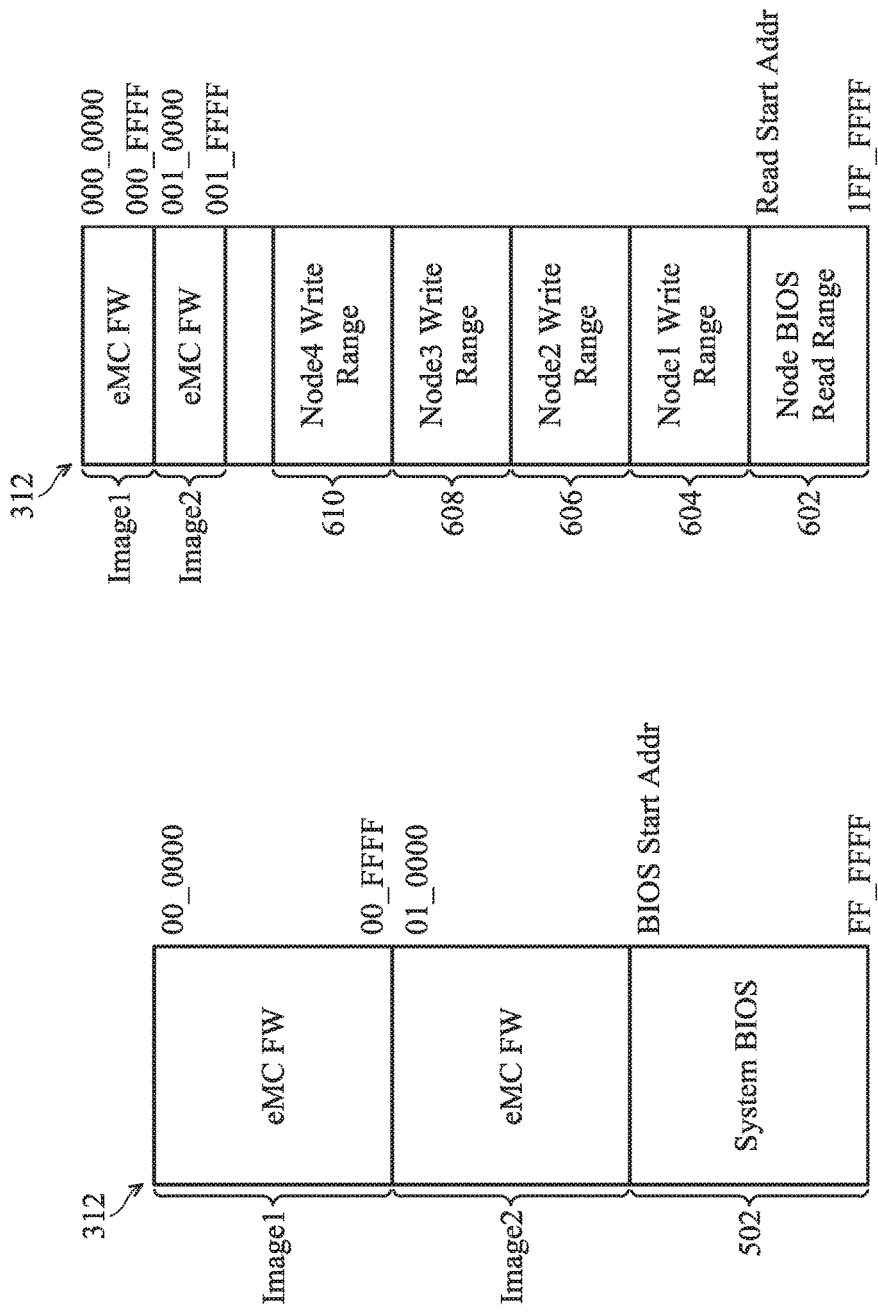

CHIPSET AND SERVER SYSTEM USING THE SAME

CROSS REFERENCE TO RELATED APPLICATIONS

This application claims priority of China Patent Application No. 201510780873.3, filed on Nov. 13, 2015, the entirety of which is incorporated by reference herein.

BACKGROUND OF THE INVENTION

Field of the Invention

The present invention relates to server system management.

Description of the Related Art

For a server system, it is important to monitor the physical states of every server node and the network. An IPMI (Intelligent Platform Management Interface) protocol, whose communication protocol is very complicated, is usually adopted in the server system. Low-cost and low-complexity management architecture for a server system is called for.

BRIEF SUMMARY OF THE INVENTION

A chipset and a server system using the same are disclosed.

A chipset implemented in a server node of a server system and including an embedded management controller is disclosed in accordance with an exemplary embodiment of the disclosure. The chipset also includes a northbridge and southbridge. The embedded management controller collects inner-node information of the server node for server system management. The embedded management controller is coupled to a baseboard management controller, and the baseboard management controller is outside the server node and communicates with a remote console through network.

A server system in accordance with an exemplary embodiment of the disclosure includes a plurality of server nodes, a baseboard management controller and a switch module. Each server node includes a chipset comprising a northbridge and southbridge. For each server node, an embedded management controller is integrated into a chip with the chipset. Each embedded management controller collects inner-node information of the corresponding server node for server system management. The baseboard management controller is outside the plurality of server nodes and communicates with a remote console through the network. The switch module selectively couples the embedded management controllers on the different server nodes to the baseboard management controller.

In an exemplary embodiment, the server system includes a blade. The plurality of server nodes, the switch module and the baseboard management controller are provided thereon.

In another exemplary embodiment, the server system includes a backplane and a plurality of blades inserted into the backplane. The plurality of server nodes is divided into a plurality of sets and different sets of server nodes are provided on different blades. The baseboard management controller is provided on the backplane rather than the blades. The switch module includes a plurality of switch sub-modules separately provided on the blades for coupling the embedded management controllers on each blade to the baseboard management controller.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 shows the space allocation of the non-volatile memory 312 when the non-volatile memory 312 is shared by a server node and the embedded management controller eMC mounted thereon;

FIG. 6 shows the space allocation of the non-volatile memory 312 when the non-volatile memory 312 is shared by multiple server nodes and the embedded management controllers eMC mounted thereon;

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
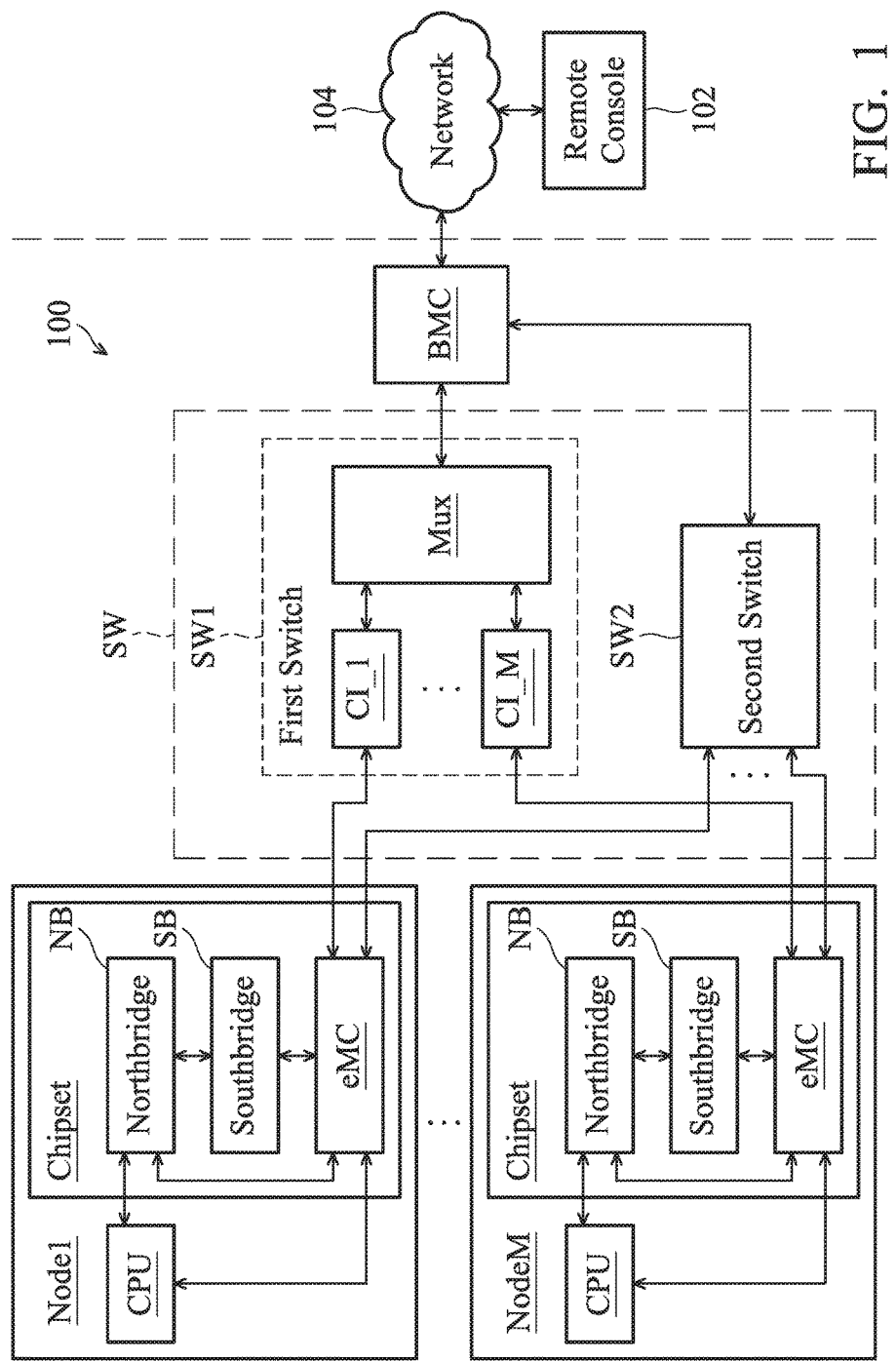
FIG. 1 depicts a server system 100 in accordance with an exemplary embodiment of the disclosure.

FIG. 1 depicts a server system 100 in accordance with an exemplary embodiment of the disclosure. The server system 100 includes a plurality of server nodes Node1 to NodeM, a baseboard management controller (abbreviated to BMC, and the abbreviation BMC is also used as labels in the figures) and a switch module SW.

The server nodes Node1 to NodeM may have similar architecture. Each server node includes a central processing unit CPU and a chipset formed by a northbridge NB and southbridge SB. The northbridge NB and southbridge SB are two separate chips or combined into a single chip. An embedded management controller (abbreviated to eMC, and the abbreviation eMC is also used as labels in the figures) is provided corresponding to each server node. In some embodiments, the eMC is integrated into the chip containing the southbridge SB. In the exemplary embodiment shown in FIG. 1, the embedded management controller eMC is integrated into the chipset chip. Each embedded management controller eMC collects inner-node information of the corresponding server node for server system management. The inner-node information may include information about the central processing unit (abbreviated to CPU, and the abbreviation CPU is also used as labels in the figures) or the northbridge NB or the southbridge SB. Furthermore, the sensing data of the sensors (e.g. fan sensor) mounted on each server node may be also collected by the corresponding embedded management controller eMC as the inner-node information. Via the on-chip communication paths supported by the chipset to collect the inner-node information of the corresponding server node, it is not necessary for the communication between the embedded management controller eMC and the corresponding server node to rely on the complex IPMI (Intelligent Platform Management Interface) protocol. A low-cost and low complexity server system management architecture is established. In addition to inner-node information collection (e.g. inner-node status collecting and reporting), the embedded management controller eMC may also support remote text console over LAN/SOL (Serial Over LAN), remote reboot/power-on/power-off operations, remote audit BIOS setting, SEL/FRU, BIOS boot order modification or any combination thereof.

As shown, the baseboard management controller BMC is disposed outside the server nodes Node1 to NodeM and communicates with a remote console 102 through the network 104. The switch module SW selectively couples the embedded management controllers (all marked eMC) on the different server nodes Node1 to NodeM to the baseboard management controller BMC.

In the exemplary embodiment of FIG. 1, the switch module SW provides a first switch SW1 corresponding to a first communication interface (e.g. I2C) and a second switch SW2 corresponding to a second communication interface (e.g. UART). Through the first switch SW1, the inner-node information of the different server nodes Node1 to NodeM is transferred to the baseboard management controller BMC, and the outer-node information, like the node control command and other information from the remote console 102, is transferred from the baseboard management controller BMC to the server nodes Node1 to NodeM. As shown, the first switch SW1 may have multiple interface modules CI_1 to CI_M (e.g. I2C modules) and a multiplexer Mux. The interface modules CI_1 to CI_M are coupled to the embedded management controllers eMC on the different server nodes Node1 to NodeM, respectively. The multiplexer Mux is provided to selectively couple one of the interface modules CI_1 ... CI_M to the baseboard management controller BMC. It is worth to note that the eMC is coupled to the first switch SW1 and the baseboard management controller BMC by a first serial bus (like, I2C bus), whose communication protocol is much simpler than IPMI protocol. The connections and communication of the whole server system are simplified, and the communication could be initiated either by the baseboard management controller BMC or the embedded management controller eMC. The details will be discussed thereafter in FIG. 4. As for some special outer-node requests that the baseboard management controller BMC sends for server system management, the communication between the baseboard management controller BMC and the server nodes Node1 to NodeM is controlled by the second switch SW2. One special outer-node request, for example, is the SOL (Serial Over LAN) operation, that enables the input and output of the serial port of the server node to be redirected over an internet protocol address (an IP address). In such special outer-node request, the communication is only initiated by the baseboard management controller BMC but not the embedded management controller eMC. The second switch SW2 is operative to build a connection between the baseboard management controller BMC and one of the embedded management controllers eMC at the different server nodes Node1 to NodeM for transmission for the outer-node information request relied on the second communication interface. It is worth to note that the eMC is coupled to the second switch SW2 and the baseboard management controller BMC by a second serial bus (like, UART bus), whose communication protocol is also much simpler than IPMI protocol.

Figure 2A:
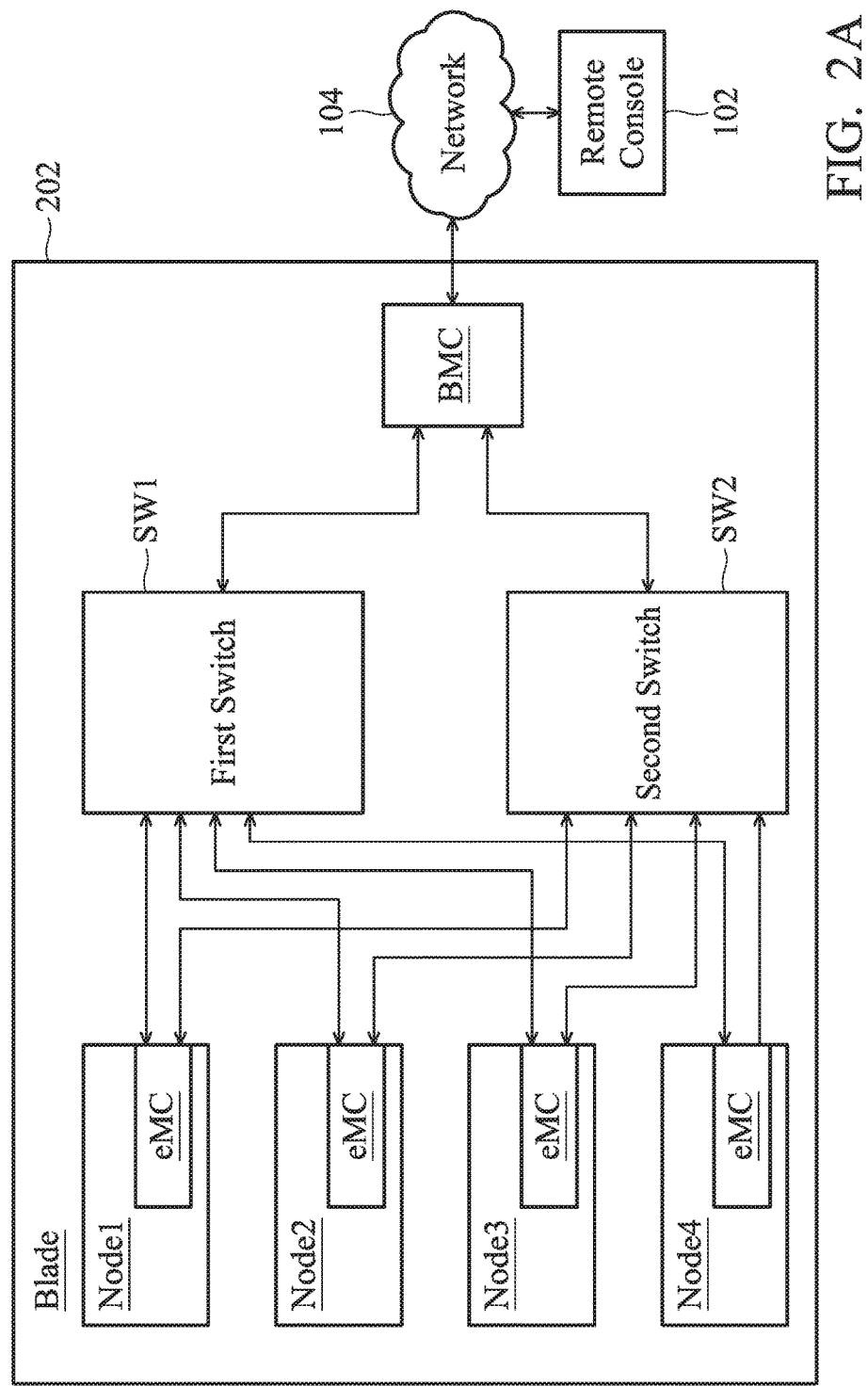
FIG. 2A depicts a server system having a blade 202 in accordance with an exemplary embodiment of the disclosure.

In an exemplary embodiment, the baseboard management controller BMC may be provided on a blade with multiple server nodes. FIG. 2A depicts a server system having a blade 202 in accordance with an exemplary embodiment of the disclosure. There are multiple server nodes Node1 to Node4, a switch module (containing first and second switches SW1 and SW2) and a baseboard management controller BMC provided on the blade 202. The remote console 102 communicates with the embedded management controllers eMC on the different server nodes Node1 to Node4 through the management NIC (Network Interface Card) on the baseboard management controller BMC to collect inner-node information and control inner-node status. In an exemplary embodiment, first switch SW1 relies on an I2C protocol and second switch SW2 relies on a UART protocol. The baseboard management controller BMC gets inner-node information from the embedded management controllers eMC through I2C bus and transforms the inner-node information to follow IPMI protocol to be transferred to the remote console 102 through the network 104. SOL and some other special operations are based on the UART bus between baseboard management controller BMC and the server nodes Node1 ... Node4. It is worth to note that although there are 4 nodes on the blade 202, alternative numbers of server nodes are contemplated.

Figure 2B:
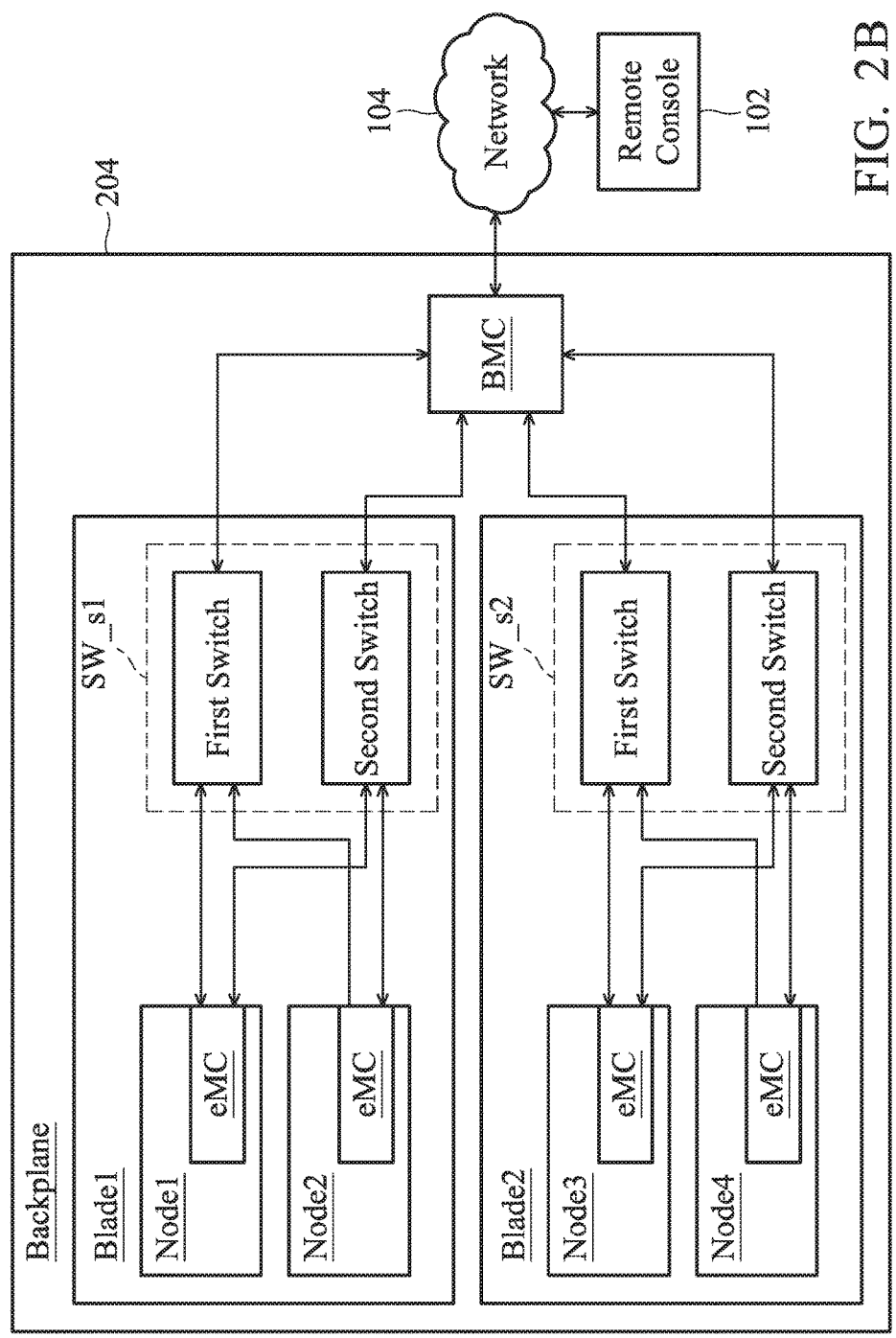
FIG. 2B depicts a server system having a backplane 204 and a plurality of blades Blade1 and Blade2 inserted into the backplane 204.

Referring back to FIG. 1, the server nodes Node1 to NodeM of the server system 100 may be divided into a plurality of sets and different sets of server nodes may be provided on different blades. FIG. 2B depicts a server system having a backplane 204 and a plurality of blades Blade1 and Blade2 inserted into the backplane 204. As shown, there is one set of server nodes Node1 and Node2 provided on blade Blade1 and another set of server nodes Node3 and Node4 provided on blade Blade2. The baseboard management controller BMC is provided on the backplane 204 rather than the blades Blade1 and Blade2. The switch module comprises a plurality of switch sub-modules SW_s1 and SW_s2 separately provided on the blades Blade1 and Blade2 for coupling the embedded management controllers eMC on each blade to the baseboard management controller BMC. As shown, each of the switch sub-modules SW_s1 and SW_s2 comprises a first switch and a second switch. As indicated by the aforementioned discussion, the first switches may rely on I2C protocol and the second switches may rely on UART protocol. It is worthy to note that the baseboard management controller BMC provided on the backplane 204 in FIG. 2B must be more powerful than the BMC provided on the blade in FIG. 2A if the number of the server nodes on each blade is the same (i.e., each blade has 4 server nodes). And the cost of the server system of FIG. 2B is lower than the one of the FIG. 2A, because in the server system of FIG. 2A each blade has its dedicated BMC.

Figure 3:
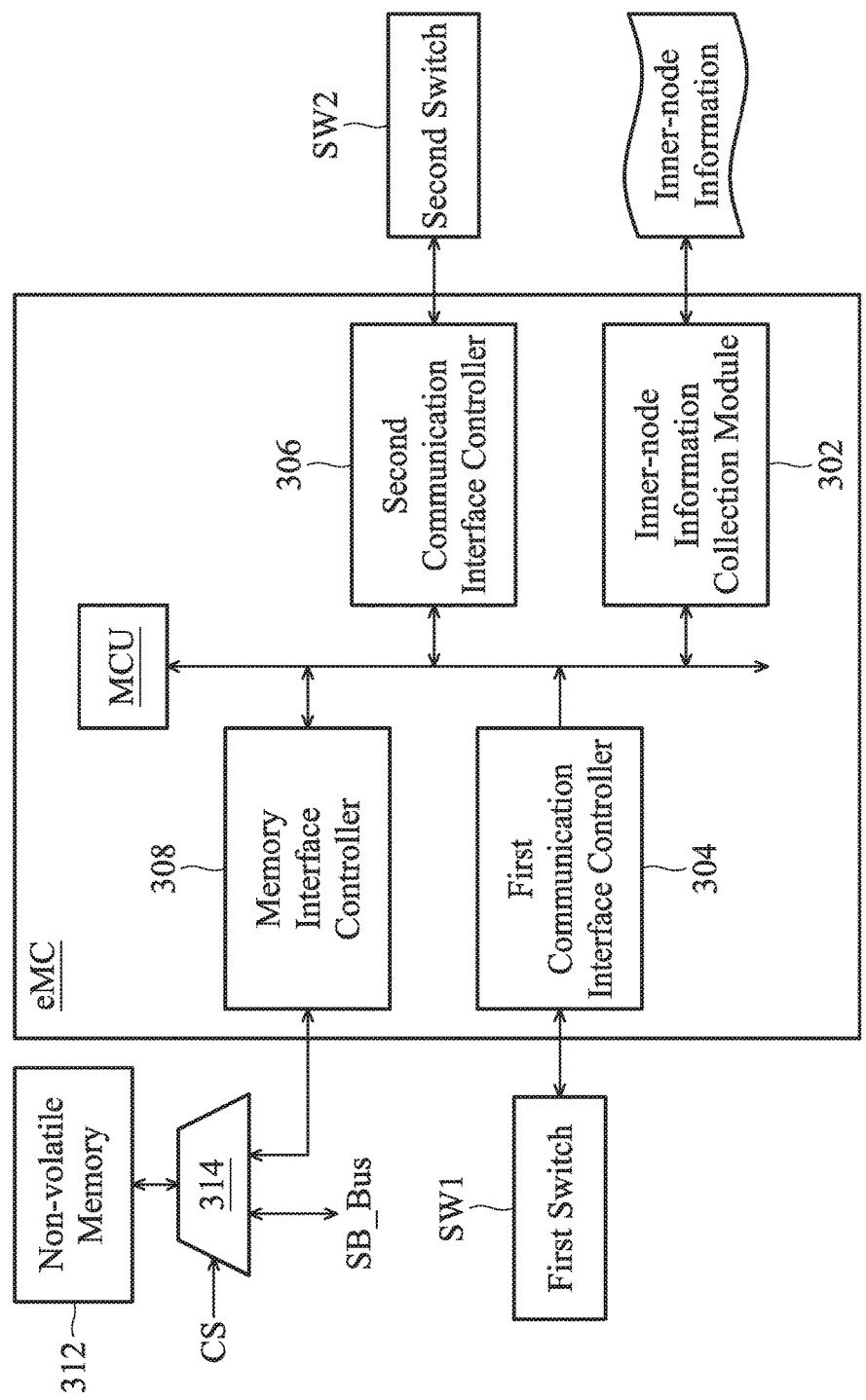
FIG. 3 is a block diagram depicting the embedded management controller eMC in accordance with an exemplary embodiment of the disclosure.

FIG. 3 is a block diagram depicting the embedded management controller eMC in accordance with an exemplary embodiment of the disclosure. The embedded management controller eMC comprises a microcontroller MCU, an inner-node information collection module 302, two communication interface controllers (including a first communication interface controller 304 and a second communication interface controller 306) and a memory interface controller 308. The inner-node information collection module 302 is operated by the microcontroller MCU and follows the on-chip communication protocols supported by the chipset to collect the inner-node information from the components (like CPU, southbridge SB, northbridge NB, fan and etc.) of the sever node. The first communication interface controller 304 is controlled by the microcontroller MCU to transfer the inner-node information to the baseboard management controller BMC via the first switch SW1, and to receive outer-node information from the baseboard management controller BMC via the first switch SW1. It is worth to note that the first communication interface controller 304 is coupled to the first switch SW1 and the baseboard management controller BMC by a first serial bus (like, I2C bus), whose communication protocol is much simpler than IPMI protocol. The second communication interface controller 306 is coupled to the second switch SW2 and controlled by the microcontroller MCU to receive outer-node requests sent by the baseboard management controller BMC for the server system management. It is worth to note that the second communication interface controller 306 is coupled to the second switch SW2 and the baseboard management controller BMC by a second serial bus (like, UART bus), whose communication protocol is much simpler than IPMI protocol. The memory interface controller 308 is controlled by the microcontroller MCU to access a non-volatile memory 312 that is shared with the sever node equipped with the embedded management controller eMC. The non-volatile memory 312 may be a flash memory and the memory interface controller 308 may follow SPI (Serial Peripheral Interface) protocol. A multiplexer 314 is provided to select the access path to the non-volatile memory 312. According to a control signal CS, the non-volatile memory 312 is accessed by the embedded management controller eMC via the memory interface controller 308 or the southbridge SB via one on-chip path SB_Bus supported by the southbridge SB.

How to transfer the inner-node information from an embedded management controller eMC to the baseboard management controller BMC is discussed in this paragraph. Because multiple embedded management controllers eMC of multiple sever nodes are coupled to the same baseboard management controller BMC, when any embedded management controller eMC needs to initiate the transmission of the inner-node information to the baseboard management controller BMC, it will use the following interrupt mechanism: before transferring the inner-node information to the baseboard management controller BMC, the microcontroller MCU asserts an interrupt status "INT" and thereby the baseboard management controller BMC differentiates the server node showing the interrupt status "INT" from the remaining server nodes. The microcontroller MCU controls the first communication interface controller 304 to start transferring the inner-node information to the baseboard management controller BMC when receiving a grant command "Grant" that the baseboard management controller BMC outputs for the server node with the asserted interrupt status "INT". In an exemplary embodiment, the embedded management controller eMC may be an 8051 based controller. The microcontroller MCU may be an 8051 microcontroller.

Figure 4:
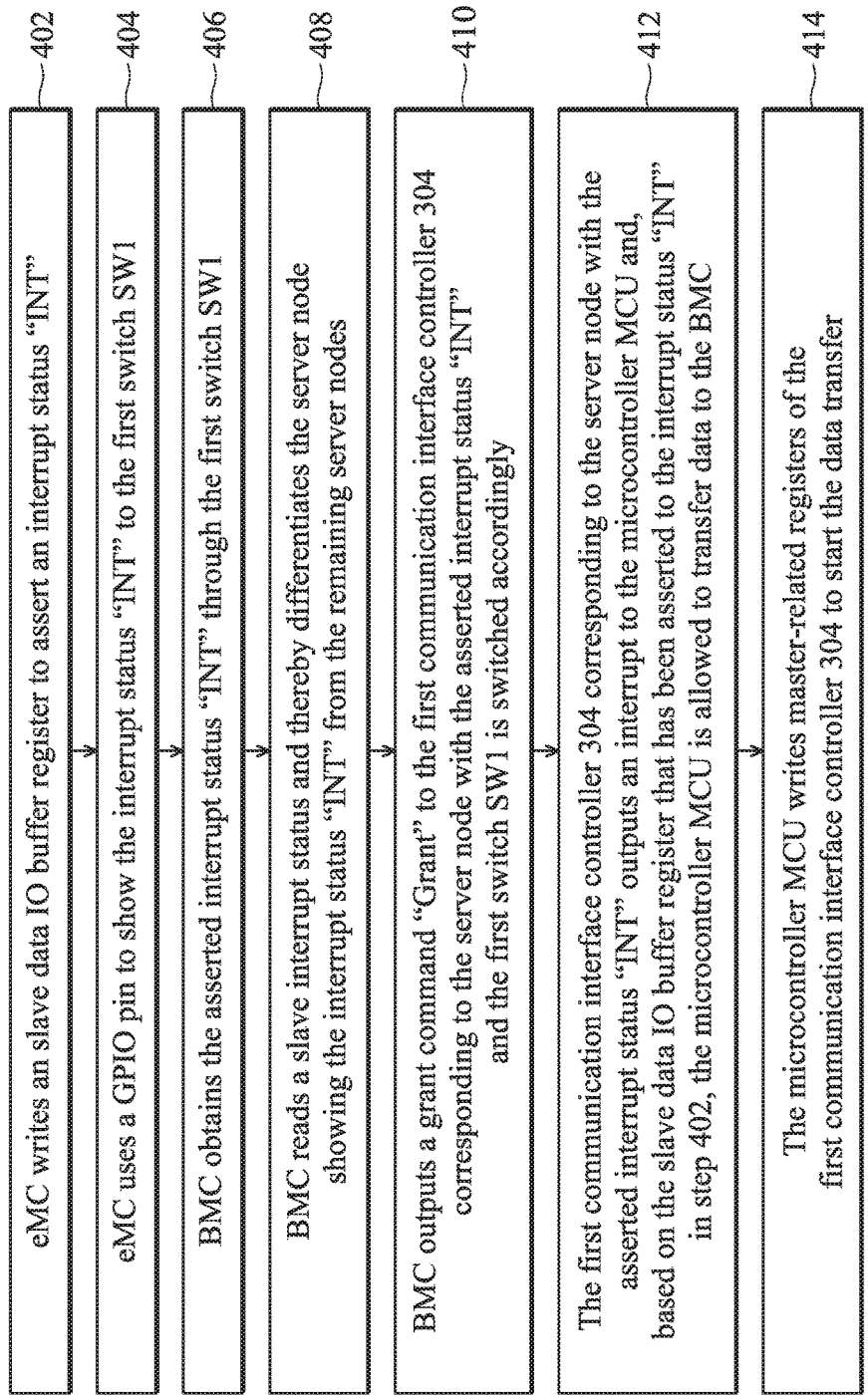
FIG. 4 is a flowchart depicting how the embedded management controller eMC transfers the inner-node information to the baseboard management controller BMC through the first switch (i.e. I2C switch)

FIG. 4 is a flowchart depicting how the embedded management controller eMC transfers the inner-node information to the baseboard management controller BMC through the first switch (i.e. I2C switch). In step 402, MCU of the embedded management controller eMC writes a slave data IO buffer register in the first communication interface controller 304 to assert an interrupt status "INT". In step 404, the microcontroller MCU uses a GPIO pin to show the interrupt status "INT" to the first switch SW1. In step 406, the baseboard management controller BMC obtains the asserted interrupt status "INT" through the first switch SW1. In step 408, the baseboard management controller BMC reads a slave interrupt status from the slave data IO buffer register in the first communication interface controller 304 of each eMC and thereby differentiates the server node showing the interrupt status "INT" from the remaining server nodes. In step 410, the baseboard management controller BMC outputs a grant command "Grant" to the first communication interface controller 304 corresponding to the server node with the asserted interrupt status "INT" and the first switch SW1 is switched to generate a connection between the baseboard management controller BMC and the server node with the asserted interrupt status "INT". In one exemplary embodiment, the corresponding one of the interface modules CI_1 to CI_M is opened to establish the connection. In 412, the first communication interface controller 304 corresponding to the server node with the asserted interrupt status "INT" outputs an interrupt to the microcontroller MCU on the same sever node and, based on the slave data IO buffer register that has been asserted to the interrupt status "INT" in step 402, the microcontroller MCU is allowed to transfer data to the baseboard management controller BMC through the first switch SW1. In step 414, the microcontroller MCU writes master-related registers in the first communication interface controller 304 to start the data transfer. In comparison with conventional techniques, the baseboard management controller BMC transfers the outer-node information to the embedded management controller eMC through the first switch (i.e. I2C switch) in a much simpler way. The baseboard management controller BMC directly opens the corresponding one of the interface modules CI_1 to CI_M corresponding to the target server node and then starts to transfer the outer-node information to the embedded management controller eMC on the target server node.

FIG. 5 shows the space allocation of the non-volatile memory 312 when the non-volatile memory 312 is shared by a server node and the embedded management controller eMC mounted thereon. In addition to the eMC firmware images Image1 and Image2 (Image2 is for example the backup of Image1), the non-volatile memory 312 is further allocated to provide a space 502 for the system firmware of the corresponding server node. The system firmware, for example, is system BIOS (Basic Input Output System).

FIG. 6 shows the space allocation of the non-volatile memory 312 when the non-volatile memory 312 is shared by multiple server nodes and the embedded management controllers eMC mounted thereon. In this exemplary embodiment, there are four server nodes Node1 to Node4. In addition to the eMC firmware images Image1 and Image2, the non-volatile memory 312 is further allocated to provide a space 602 as the node BIOS read range (e.g., storing BIOS codes for the server nodes Node1 to Node4) and sections of write areas for the different server nodes Node1 to Node4

(e.g., a write range 604 for Node1, a write range 606 for Node2, a write range 608 for Node3 and a write range 610 for Node4).

Figure 7A:
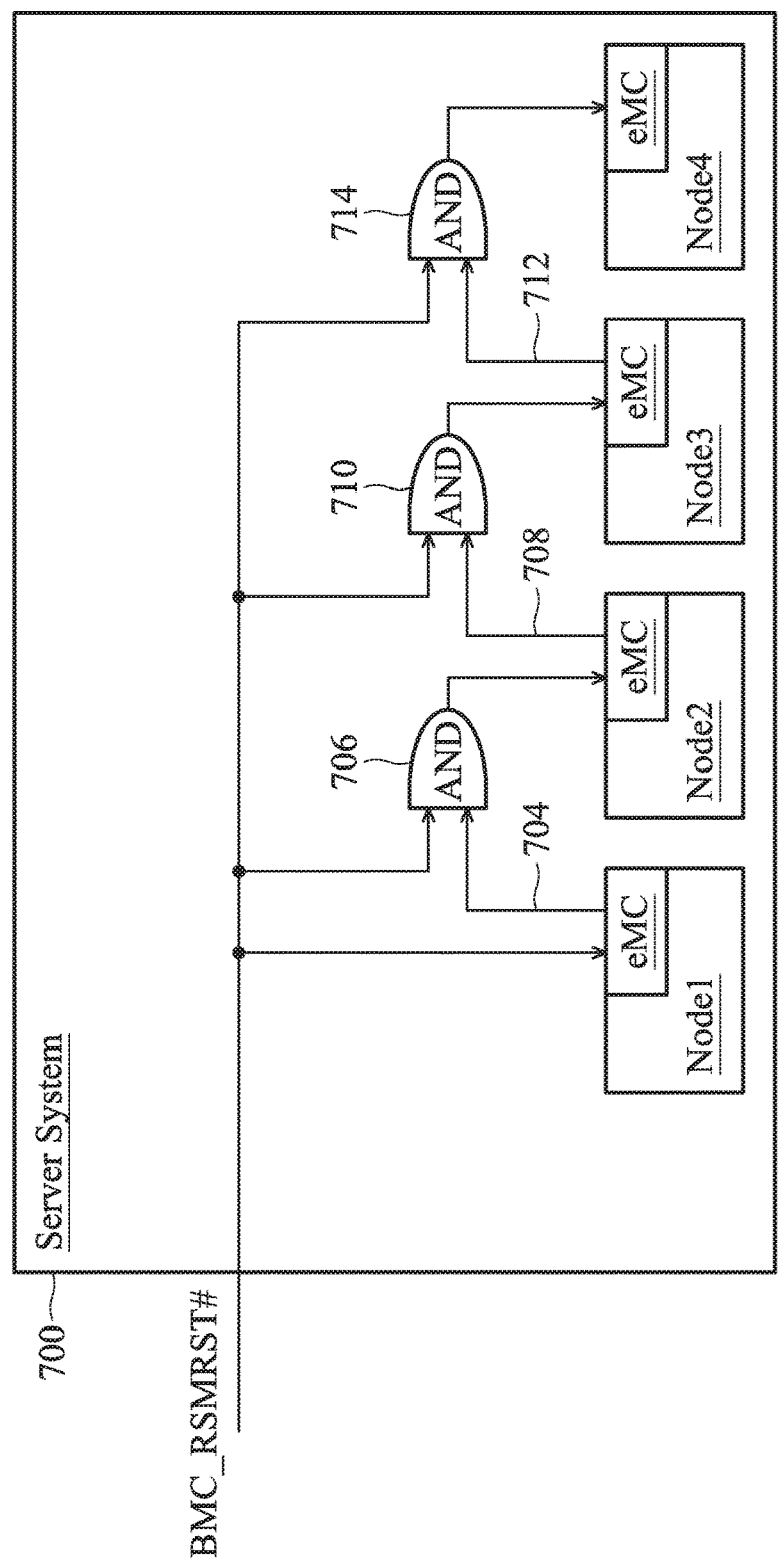
FIG. 7A depicts a logic circuit on a server system 700 for a boot up procedure, the server system 700 providing multiple server nodes Node1 . . . Node4 and the chip sets of the different server nodes Node1 . . . Node4 and the embedded management controllers eMC mounted thereon sharing the same flash memory (312) as that shown in FIG. 6.
Figure 7B:
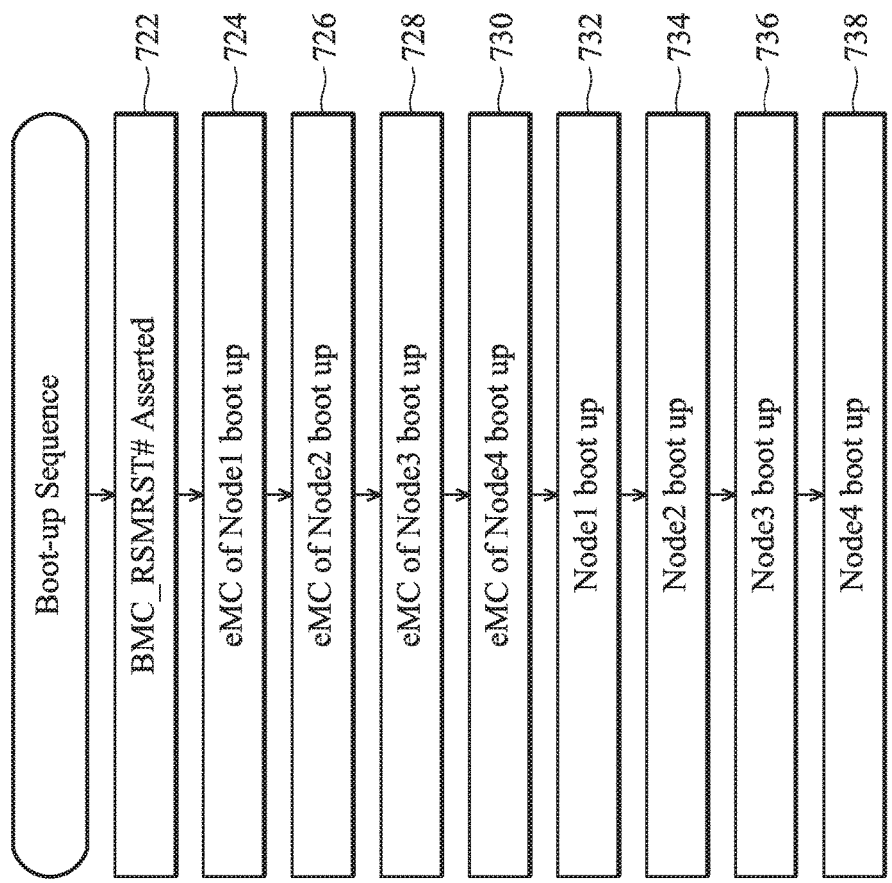
FIG. 7B shows a boot-up sequence about the elements mounted on the server system 700 in accordance with an exemplary embodiment of the disclosure.

FIG. 7A depicts a logic circuit on a server system 700 for a boot up procedure, the server system 700 providing multiple server nodes Node1 . . . Node4 and the chip sets of the different server nodes Node1 . . . Node4 and the embedded management controllers eMC mounted thereon sharing the same flash memory (312) as that shown in FIG. 6. When the baseboard management controller BMC asserts a power-on signal BMC_RSMRST#, the embedded management controller eMC of the server node Node1 boots up and asserts the signal 704. Thus, the output signal of the AND gate 706 is asserted and thereby the embedded management controller eMC of the server node Node2 boots up and asserts the signal 708. Thus, the output signal of the AND gate 710 is asserted and thereby the embedded management controller eMC of the server node Node3 boots up and asserts the signal 712. Thus, the output signal of the AND gate 714 is asserted and thereby the embedded management controller eMC of the server node Node4 boots up. The embedded management controllers eMC of the server nodes Node1 to Node4 provided on the server system 700 boot up one by one to access the eMBC firmware code in the flash memory (312) at different times. After being booted up, the embedded management controllers eMC of the server nodes Node1 . . . Node 4 provided on the server system 700 start to boot up the corresponding chipsets of the server nodes Node1 . . . Node4. The chipsets of the server nodes Node1 . . . Node4 boot up one by one to access the node's system firmware code (for example, BIOS code) in the flash memory (312) at different times. In an exemplary embodiment, the embedded management controllers eMC of the server nodes Node1 . . . Node4 provided on the server system 700 and the server nodes Node1 . . . Node4 corresponding thereto boot up in an identical order. FIG. 7B shows a boot-up sequence about the elements mounted on the server system 700 in accordance with an exemplary embodiment of the disclosure. In step 722, the power-on signal BMC_RSMRST# from the baseboard management controller BMC for the server system 700 is asserted. In steps 724 to 730, the embedded management controllers eMC on the server system 700 boot up in the order Node1 to Node4. In steps 732 to 738, the chipsets on the server system 700 boot up in the order Node1 to Node4.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A server system, comprising:
a plurality of server nodes each including a chipset comprising a northbridge and southbridge, wherein for each server node an embedded management controller is integrated into a chip with the chipset and the embedded management controller collects inner-node information of the corresponding server node for server system management;
a baseboard management controller, outside the plurality of server nodes and communicating with a remote console through a network; and
a switch module, selectively coupling the embedded management controllers on the different server nodes to the baseboard management controller,
wherein:
for one of the server nodes, before transferring the inner-node information to the baseboard management controller, the corresponding embedded management controller asserts an interrupt status and thereby the baseboard management controller differentiates the server node showing the interrupt status from the remaining server nodes;
the embedded management controllers of the different server nodes share a non-volatile memory, and the non-volatile memory is allocated to store firmware code for the embedded management controllers;
each embedded management controller comprises a memory interface controller that is controlled to access the non-volatile memory that is further shared with a system firmware of the corresponding server node;
the non-volatile memory is further allocated to provide sections of write areas for the different server nodes;
the embedded management controllers of the server nodes boot up one by one; and
after the embedded management controllers of the server nodes boot up, the chipsets of the server nodes boot up one by one.

2. The server system as claimed in claim 1, further comprising:
a blade, having the plurality of server nodes, the switch module and the baseboard management controller.

3. The server system as claimed in claim 1, further comprising:
a backplane and a plurality of blades inserted into the backplane;
wherein:
the server nodes are divided into a plurality of sets and different sets of server nodes are provided on different blades; and
the baseboard management controller is provided on the backplane rather than the blades;
the switch module comprises a plurality of switch sub-modules separately provided on the blades for coupling the embedded management controllers on each blade to the baseboard management controller.

4. The server system as claimed in claim 1, wherein each embedded management controller comprises:
a microcontroller; and
a first communication interface controller, controlled by the microcontroller to transfer the inner-node information to the baseboard management controller and to receive outer-node information from the baseboard management controller,
wherein each first communication interface controller is coupled to the baseboard management controller by a corresponding first serial bus.

5. The server system as claimed in claim 1, wherein:
when receiving a grant command that the baseboard management controller outputs for the server node with the asserted interrupt status, the embedded management controller of the server node with the asserted interrupt status starts transferring the inner-node information to the baseboard management controller.

6. The server system as claimed in claim 4, wherein each embedded management controller further comprises:
a second communication interface controller controlled by the corresponding microcontroller to receive an outer-node request that the baseboard management controller sends for server system management, wherein each second communication interface controller is coupled to the baseboard management controller by a corresponding second serial bus.

7. The server system as claimed in claim 1, wherein:

the system firmware code is system Basic Input Output System code of the server nodes.

* * * * *